(12) United States Patent
Sumiyashiki et al.

(10) Patent No.: US 6,530,536 B2
(45) Date of Patent: Mar. 11, 2003

(54) WEBBING RETRACTOR

(75) Inventors: Akira Sumiyashiki, Aichi-ken (JP); Tomonori Nagata, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 7 days.

(21) Appl. No.: 09/899,861

(22) Filed: Jul. 9, 2001

(65) Prior Publication Data

US 2002/0008171 A1 Jan. 24, 2002

(51) Int. Cl.$^7$ .................. B60R 22/38; B60R 22/40
(52) U.S. Cl. ................ 242/383.2; 242/383.5; 242/384.6; 280/806; 297/478
(58) Field of Search ................ 242/383.2, 383.5, 242/384.6; 280/806; 297/478

(56) References Cited

U.S. PATENT DOCUMENTS

| | | | |
|---|---|---|---|
| 5,441,209 A | | 8/1995 | Fujimura et al. |
| 5,482,224 A | * | 1/1996 | Fujimura et al. .... 242/383.2 X |
| 6,068,208 A | * | 5/2000 | Matsuki et al. .......... 242/383.2 |
| 6,305,633 B1 | * | 10/2001 | Asagiri et al. ............ 242/383.2 |
| 6,352,213 B1 | * | 3/2002 | Sumiyashiki et al. .... 242/383.2 |
| 6,354,528 B1 | * | 3/2002 | Nagata et al. ....... 242/383.2 X |
| 2002/0005449 A1 | * | 1/2002 | Sumiyashiki ............ 242/383.2 |

FOREIGN PATENT DOCUMENTS

| | | |
|---|---|---|
| EP | 0123 219 | 4/1984 |
| JP | 5-246303 | 9/1993 |

* cited by examiner

Primary Examiner—Kathy Matecki
Assistant Examiner—Minh-Chau Pham
(74) Attorney, Agent, or Firm—Nixon Peabody LLP; Thomas W. Cole

(57) ABSTRACT

A guide pin is provided erect at a lock plate of a webbing retractor. A guide hole is formed in a V gear in correspondence with the guide pin. The guide hole is formed from a first hole portion, a second hole portion and a third hold portion. A state in which the guide pin is positioned in the first hole portion is an initial state. When relative rotation between the V gear and a spool arises, the guide pin moves from the first hole portion and reaches the second hole portion. In this process, the guide pin pushes the V gear so as to rotate reversely, and locking is cancelled. When a pushing force causing a V gear reverse rotation angle to exceed a set value is applied from the guide pin, the guide pin escapes into the third hole portion such that excessive pushing force is cancelled.

20 Claims, 12 Drawing Sheets

WEBBING RETRACTOR

BACKGROUND OF THE INVENTION

1. Field of the Invention

The present invention relates to a webbing retractor which can impede pulling-out of a webbing at a time when a vehicle rapidly decelerates or the like, and in particular, to a webbing retractor which, after impeding pulling-out of a webbing, enables the webbing to be pulled out again.

2. Description of the Related Art

Generally, in a webbing retractor, a webbing is wound in a roll form on a hollow cylindrical spool (take-up shaft) supported at a frame which is formed in a substantial U-shape as seen in plan view and which is fixed to a vehicle. Usually, the webbing can be freely taken-up or pulled-out due to the spool rotating freely. Further, in the webbing retractor, a WSIR (webbing sensitive inertia reel) or a VSIR (vehicle sensitive inertia reel) is utilized in order to impede pulling-out of the webbing when a rapid deceleration of the vehicle or a rapid pulling-out of the webbing is sensed.

Hereinafter, a conventional webbing retractor equipped with a WSIR and a VSIR will be described on the basis of FIGS. 12A and 12B.

In FIGS. 12A and 12B, a webbing retractor 100 is shown in a side view seen from a rotational axis direction of a spool 102. The webbing retractor 100 is formed to include the spool 102; a lock plate 104 which is supported at the spool 102 so as to be freely swingable and which can mesh with ratchet teeth 106 provided at a frame (not shown); a V gear 108 which is provided coaxially with the spool 102, and when relative rotation with respect to the spool 102 arises, the V gear 108 guides the lock plate 104 to a position at which engagement with the ratchet teeth 106 ismpossible; a W sensor portion 110 which forms the WSIR; and a V sensor portion 120 which forms the VSIR.

In this webbing retractor 100, usually, the spool 102 and the V gear 108 rotate integrally. Thus, the webbing can be freely taken-up and pulled-out (the state shown in FIG. 12A) without the lock plate 104 engaging the ratchet teeth 106.

On the other hand, when the webbing is pulled-out rapidly, an inertia plate 116 of the W sensor portion 110 cannot follow the rotation of the V gear 108 (the spool 102) in the webbing pull-out direction (direction A in FIGS. 12A and 12B), and an inertial delay arises. As a result, relative rotation in the webbing take-up direction arises between the inertia plate 116 and the V gear 108. A pawl 112 which abuts the inertia plate 116 is swung in the webbing take-up direction and engages with internal teeth 118 fixed to the frame, and rotation of the V gear 108 in the webbing pull-out direction is impeded (the state shown in FIG. 12B).

When the rotation of the V gear 108 in the webbing pull-out direction is impeded, relative rotation is generated between the V gear 108 and the spool 102 which continues to rotate along with the pulling-out of the webbing. As a result, the lock plate 104, which has a guide pin 104a which is inserted into a guide hole 108a formed in the V gear 108, does not follow the rotation of the spool 102, and is guided by the guide hole 108a via the guide pin 104a, and reaches a position at which engagement with the ratchet tooth 106 is possible (a position at which the lock plate 104 and the tooth tip of the ratchet tooth 106 engage). The lock plate 104, which has been guided to the position at which engagement with the ratchet tooth 106 is possible, is guided to the tooth bottom of the ratchet tooth 106 by the configuration of the ratchet tooth 106, and is set in a locked state. In other words, the lock plate 104 is self-locked, and rotation of the spool 102 in the webbing pull-out direction is impeded.

At the time of this self-locking, the lock plate 104 moves toward the tooth bottom of the ratchet tooth 106 (i.e., toward the left in FIGS. 12A and 12B). Accompanying this movement of the lock plate 104, the guide pin 104a pushes the guide hole 108a side wall of the V gear 108 toward the left in FIG. 12, and due to this pushing moment, the V gear 108 rotates in the webbing take-up direction (direction B in FIGS. 12A and 12B). When the V gear 108 rotates by a predetermined amount in direction B, the engagement of the pawl 112 and the internal tooth 118 is cancelled. The pawl 112, which is urged to swing in direction A by being connected to one end of a spring 114 whose other end is fixed to the V gear 108, returns to its original position. In other words, the operation of the W sensor portion 110 is cancelled.

In this way, in the process in which the pulling-out of the webbing is impeded, operation of the W sensor portion 110 is cancelled. As a result, thereafter, pulling-out of the webbing is again possible. Note that, when the vehicle rapidly decelerates, tension of a predetermined value or more is applied to the webbing. Thus, while this tension is being applied, the state in which the lock plate 104 is engaged with the ratchet tooth 106 is maintained.

However, with the above-described conventional webbing retractor 100, due to the guide pin 104a of the lock plate 104 pushing the side wall of the guide hole 108a of the V gear 108, the V gear 108 is reversely rotated in the webbing take-up direction (direction B in FIGS. 12A and 12B), and the locking of the W sensor portion 110 is thereby cancelled. Thus, it is difficult to control the reverse rotation angle of the V gear.

Namely, if the reverse rotation angle of the V gear is too small, the amount of rotation of the V gear 108 in the webbing take-up direction is insufficient, and the locking of the W sensor portion 110 cannot be cancelled. On the other hand, if the reverse rotation angle of the V gear is too large, the pawl 112 engages with the next waiting internal tooth 118 and the locked state is maintained. Accordingly, accurate control of the V gear reverse rotation angle is required, and to this end, management of the dimensions of the guide hole 108a and management of the dimensions of the lock plate 104 and the like must be strictly carried out.

SUMMARY OF THE INVENTION

In view of the aforementioned, an object of the present invention is to provide a webbing retractor in which a webbing pull-out impeded state can be reliably cancelled, and in which control of a V gear reverse rotation angle is made easy.

In order to achieve the above object, a webbing retractor relating to the present invention comprises: a take-up shaft for taking-up, in roll form, a webbing for restraining a vehicle occupant; a frame which is fixed to a vehicle, and which rotatably supports both end portions of the take-up shaft, and at which a lock tooth is formed in a surface intersecting an end portion of the take-up shaft; a lock plate which is provided at at least one end portion side of the take-up shaft, and which is movable between a position of engagement with the lock tooth and a position of non-engagement with the lock tooth, and due to the lock plate engaging with the lock tooth, the lock plate impedes rotation of the take-up shaft in a webbing pull-out direction; a lock wheel provided coaxially with the take-up shaft at one end portion side of the take-up shaft, the lock wheel usually rotating integrally with the take-up shaft and holding the lock plate at the position of non-engagement, and when relative rotation arises between the lock wheel and the take-up shaft, the lock wheel moves the lock plate to the position of engagement; and a lock operation device having a pawl which is swingably supported and an engagement tooth which can engage with the pawl, the pawl usually being held at a position of non-engagement with the engagement tooth, and in a predetermined case, due to the pawl swinging and engaging with the engagement tooth, rotation of the lock wheel in the webbing pull-out direction is impeded, and due to the lock wheel being rotated in a webbing take-up direction, an engaged state of the pawl and the engagement tooth is cancelled, wherein a guide pin which projects toward the lock wheel is provided at the lock plate, and a guide hole is provided at the lock wheel, the guide pin being inserted into the guide hole, and the guide hole moving the lock plate from the position of engagement to the position of non-engagement or from the position of non-engagement to the position of engagement, and the guide hole is formed to include a first hole portion which holds the lock plate at the position of non-engagement via the guide pin, a second hole portion which communicates with the first hole portion and which, by receiving pushing force from the guide pin, makes the lock wheel rotate reversely in the webbing take-up direction, and a third hole portion which communicates with the second hole portion and which releases pushing force, of a predetermined value or more, of the guide pin which pushing force contributes to reverse rotation of the lock wheel.

In accordance with the present invention, usually, the pawl of the lock operation device is held at the non-engagement position. Thus, rotation of the lock wheel in the webbing pull-out direction is not impeded. As a result, the lock wheel rotates integrally with the take-up shaft, and the webbing is freely both pulled-out from and taken-up onto the take-up shaft. At this time, relative rotation does not arise between the take-up shaft and the lock wheel, and the guide pin of the lock plate is held in the first hole portion of the guide hole formed in the lock wheel.

On the other hand, in a predetermined case such as when the webbing is pulled-out rapidly, the lock operation device is operated. When the lock operation device operates, the pawl engages with the engagement tooth, and rotation of the lock wheel in the webbing pull-out direction is impeded. When rotation of the lock wheel in the webbing pull-out direction is impeded, relative rotation between the take-up shaft and the lock wheel arises, and the lock plate is engaged with the lock tooth of the frame (namely, the lock plate and the lock tooth are self-locked). In this way, rotation of the take-up shaft in the webbing pull-out direction is impeded.

As described above, at the time when the lock plate engages with the lock tooth of the frame, the guide pin of the lock plate passes through the second hole portion of the guide hole formed in the lock wheel. At this time, the wall surface of the second hole portion receives the pushing force from the guide pin, and the lock wheel is rotated in the webbing take-up direction. When the lock wheel rotates in the webbing take-up direction, the engaged state of the pawl and the engagement tooth at the lock operation device is cancelled.

Here, in the present invention, the third hole portion, which communicates with the second hole portion, is provided. Thus, in a case in which a pushing force of a predetermined value or greater is applied from the guide pin, the guide pin enters into the third hole portion, and the pushing force can thereby be avoided. Accordingly, the reverse rotation angle of the lock wheel can be prevented from becoming larger than needed. In other words, in accordance with the present invention, at the second hole portion, the reverse rotation angle of the lock wheel can be set to be slightly larger than the target value, so that the reverse rotation angle of the lock wheel does not become too small. If a reverse rotation angle which is greater is about to be applied to the lock wheel, the pushing force which contributes to that reverse rotation angle can be absorbed (cancelled) at the third hole portion. As a result, in accordance with the present invention, a situation can be prevented in which the reverse rotation angle of the lock wheel is too small and the lock operation device is not cancelled. Further, a situation can be prevented in which the reverse rotation angle of the lock wheel is too large, and the pawl engages with the next waiting engagement tooth.

DESCRIPTION OF THE PREFERRED EMBODIMENTS

A webbing retractor 10 relating to an embodiment of the present invention will be described on the basis of FIGS. 1 through 11.

Overall Structure of webbing Retractor 10

Figure 1:
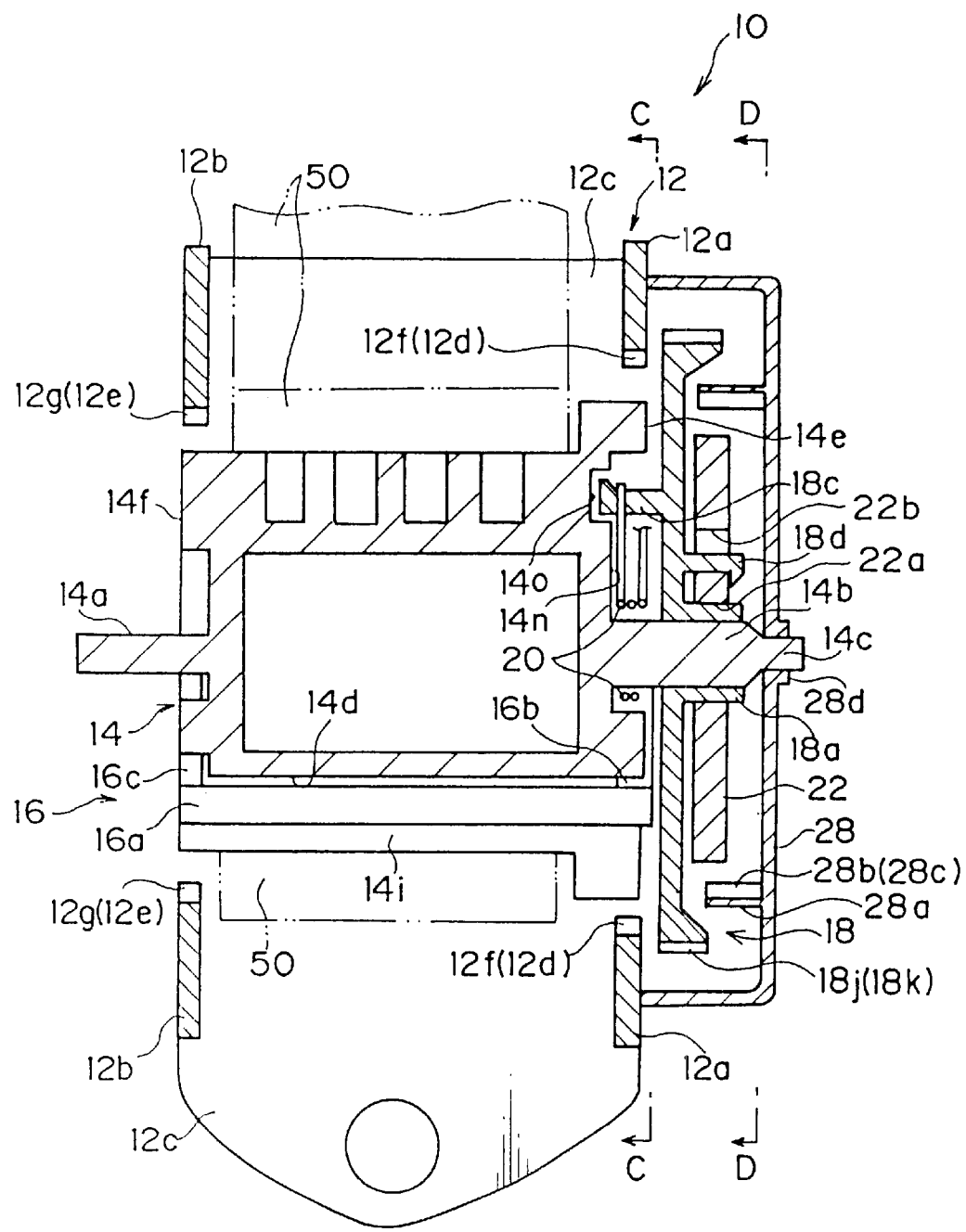
FIG. 1 is a schematic sectional view showing an overall structure of a webbing retractor relating to an embodiment of the present invention.
Figure 2:
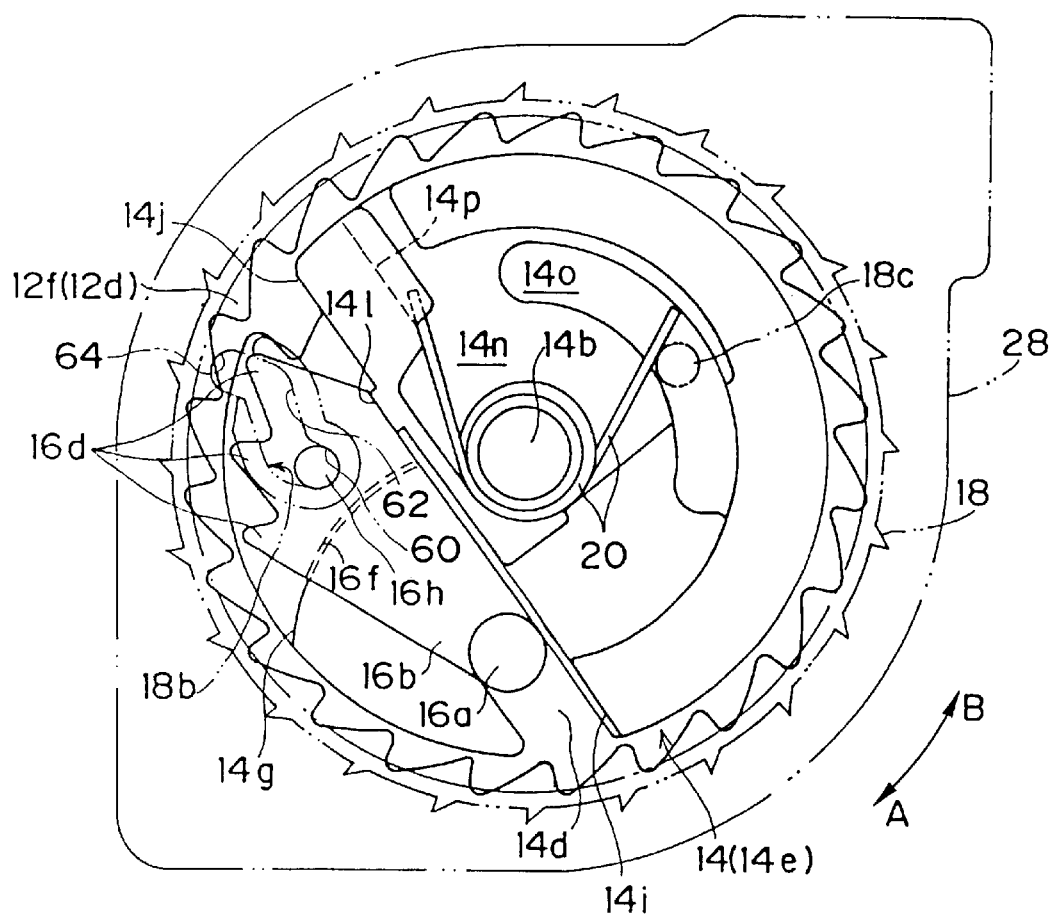
FIG. 2 is a side view, as seen from direction C—C in FIG. 1, showing an unlocked state of the webbing retractor relating to the embodiment of the present invention.
Figure 3:
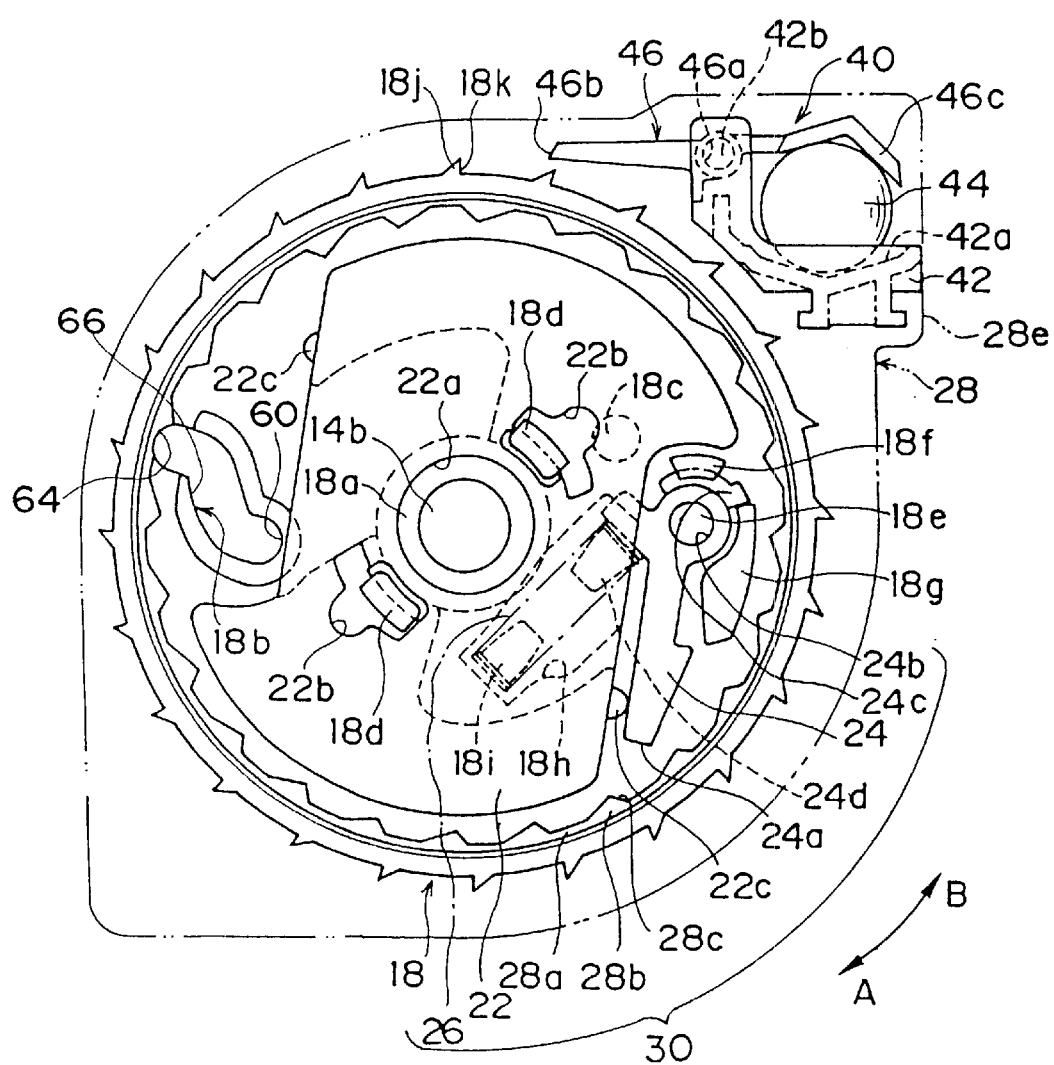
FIG. 3 is a side view, as seen from direction D—D in FIG. 1, showing a non-operating state of a W sensor 30 which forms the webbing retractor relating to the embodiment of the present invention.

First, the overall structure of the webbing retractor 10 relating to the present embodiment will be described, and thereafter, the main portions of the webbing retractor 10 relating to the present embodiment will be described. In FIG. 1, an overall structure of the webbing retractor 10 relating to the present embodiment is illustrated in cross-section. In FIGS. 2 and 3, the webbing retractor 10 as seen from the directions of C—C and D—D in FIG. 1 is shown in side view. When direction A and direction B are shown in FIGS. 1 through 11, the direction denoted as direction A for convenience indicates a webbing pull-out direction, and direction B indicates a webbing take-up direction.

As shown in FIG. 1, the webbing retractor 10 has a frame 12. The frame 12 has a pair of opposing leg pieces 12a, 12b, and a back piece 12c which connects the leg pieces 12a, 12b. The frame 12 is thereby formed in a substantial U-shape as seen in plan view. The back piece 12c extends downward, and the lower end portion thereof is fastened and fixed by bolts to a vehicle body.

Internal ratchets 12d, 12e which serve as "lock teeth" are formed by punching in the leg pieces 12a, 12b of the frame 12. Ratchet teeth 12f, 12g of the internal ratchets 12d, 12e are set to have high strength.

A hollow cylindrical spool 14, which serves as a "take-up shaft" and whose axial direction is the direction in which the leg pieces 12a, 12b oppose one another, is provided between the opposing leg pieces 12a, 12b of the frame 12. A rotation shaft 14a is formed integrally with one end portion of the spool 14, and the spool is supported at the rotation shaft 14a so as to be freely rotatable. A power spring (not shown) is connected to the distal end portion of the rotation shaft 14a, such that the spool 14 is always urged to rotate in direction B (see FIG. 2). On the other hand, a rotation shaft 14b is formed integrally with the other, end portion of the spool 14. A small diameter shaft 14c, whose diameter is small, is formed integrally at the distal end of the rotation shaft 14b. The spool 14 is rotatably supported at the small diameter shaft 14c by a bearing portion 28d of a sensor holder 28 which will be described later. Further, one end of a webbing 50 is anchored on the spool 14. Due the spool 14 rotating, the webbing 50 is freely taken-up onto and pulled-out from the spool 14.

Figure 4A:
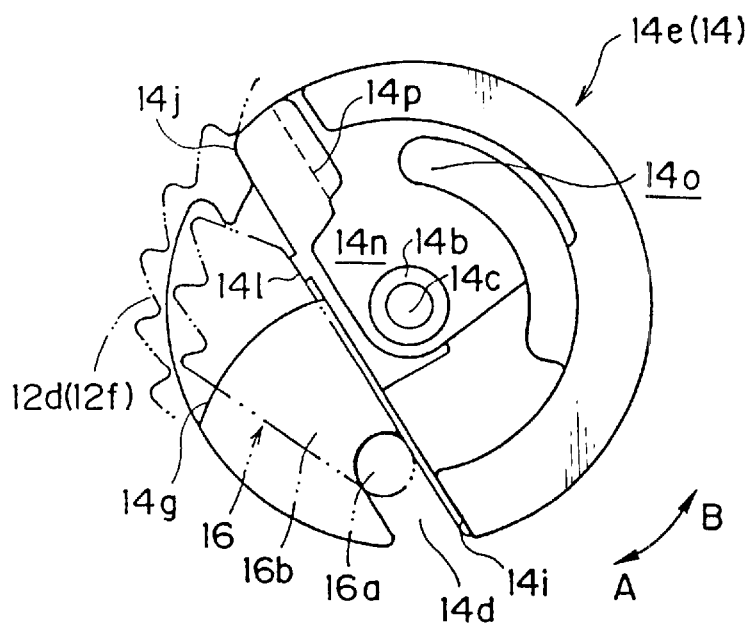
FIG. 4A is a right side view showing a spool which forms the webbing retractor relating to the embodiment of the present invention.
Figure 4B:
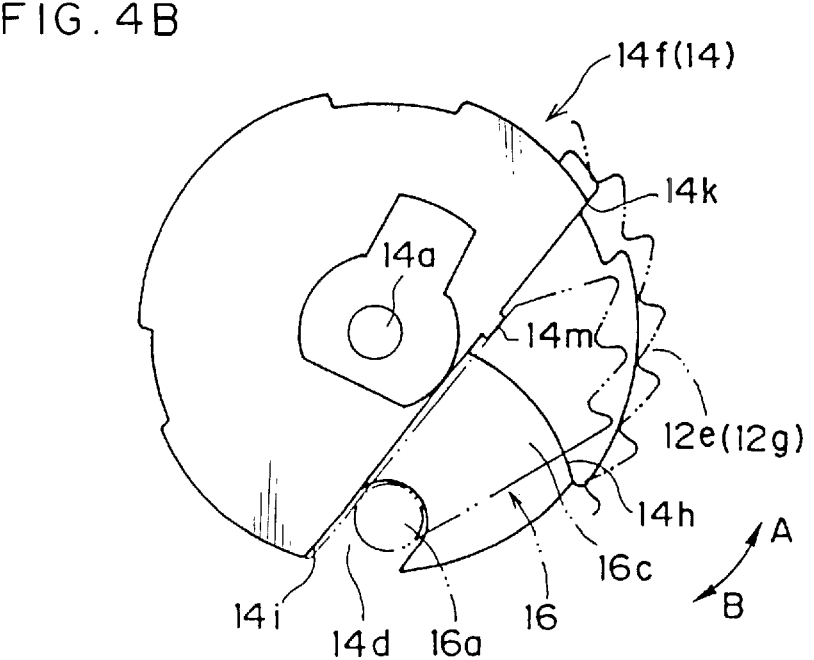
FIG. 4B is a left side view showing the spool which forms the webbing retractor relating to the embodiment of the present invention.
Figure 5:
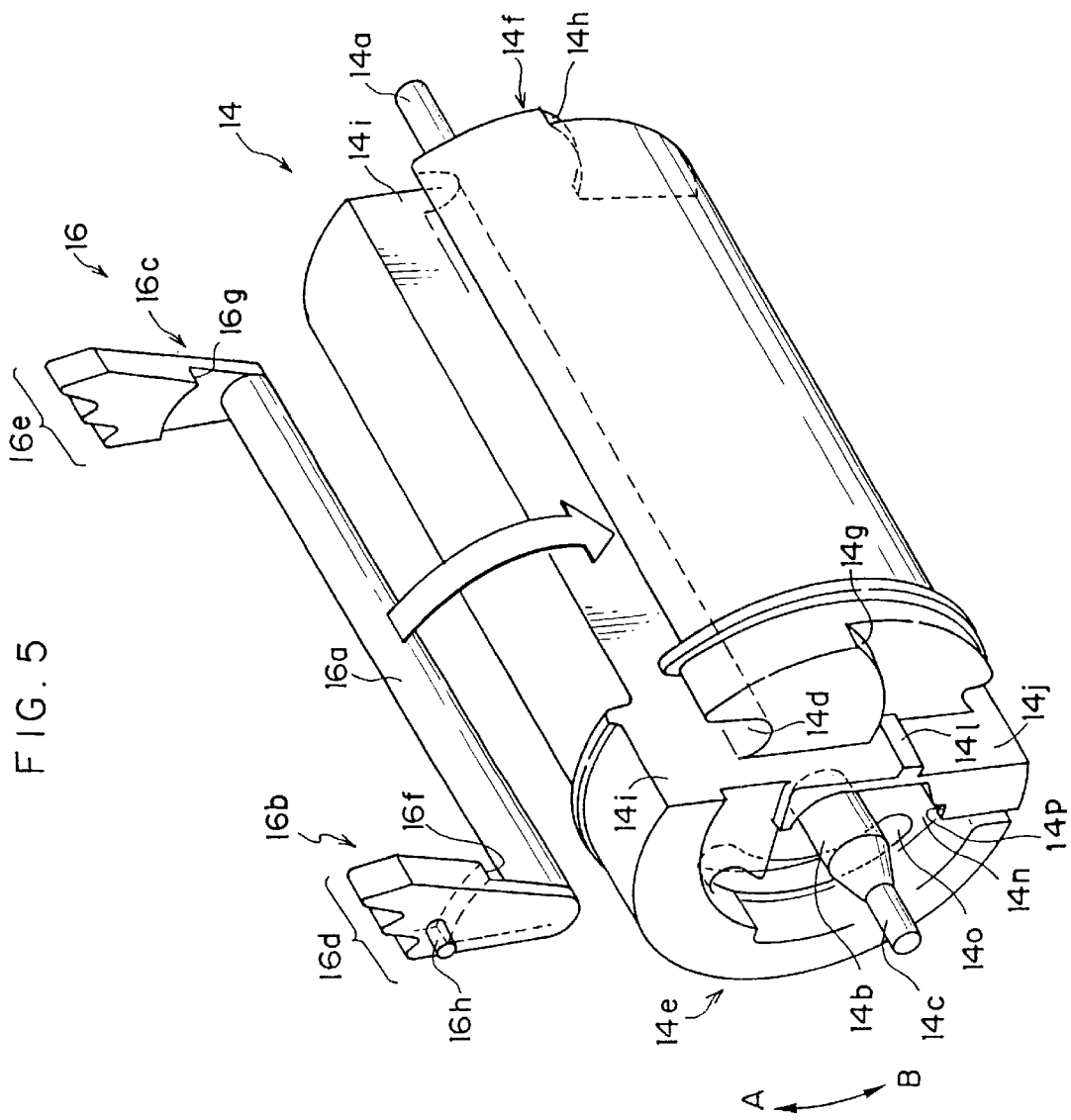
FIG. 5 is a perspective view illustrating the spool and a lock plate which form the webbing retractor relating to the embodiment of the present invention.

As shown in FIGS. 4A, 4B and 5, a cut-out portion 14d is formed at the outer surface of the spool 14. The cut-out portion 14d is positioned so as to be separated by a predetermined distance from a center line of end surfaces 14e, 14f of the spool 14, and is formed along the entire length of the spool 14 except for the portions at which the rotation shafts 14a, 14b and the small diameter shaft 14c are formed. The bottom portion of the cut-out portion 14d is formed as a semicircular arc (see FIG. 5 for example). Further, load receiving surfaces 14g, 14h are formed at the end surfaces 14e, 14f of the spool 14, respectively. The load receiving surfaces 14g, 14h are each formed by a circular arc which is concentric with the semicircular arc of the bottom portion of the cut-out portion 14d and by a step in the axial direction of the spool 14 which is formed lower at the outer side of this circular arc. Step portions 14j, 14k are formed in the end surfaces 14e, 14f of the spool 14 along a wall surface 14i at the rotating shaft 14a, 14b sides of the cut-out portion 14d. The rotating shaft 14a, 14b sides of the step portions 14j, 14k are formed to be higher than the upper portions of the load receiving surfaces 14g, 14h. Abutment portions 14l, 14m are formed at the further sides of the load receiving surfaces 14g, 14h as seen from the cut-out portion 14d.

A first concave portion 14n is formed around the rotation shaft 14b of the end surface 14e of the spool 14. A second concave portion 14o, which is formed in a circular arc shape concentric with the rotation shaft 14b, is formed in the first concave portion 14n. A spring receiving portion 14p is formed at one portion of the wall surface forming the first concave portion 14n.

As shown in FIGS. 2 and 5, a solid-cylindrical connecting shaft 16a of a lock plate 16 is swingably inserted into the cut-out portion 14d of the spool 14. Plates 16b, 16c are integrally formed at end portions of the connecting shaft 16a. Lock claws 16d, 16e, which can engage with the ratchet teeth 12f, 12g of the frame 12, are formed at the plates 16b, 16c. The distal end portions of the plates 16b, 16c, including the lock claws 16d, 16e, are formed to be thick toward the inner side of the lock plate 16. At the step portions at the boundaries between these thick and thin portions, operation surfaces 16f, 16g are formed. The operation surfaces 16f, 16g are formed from circular arcs which are concentric with the connecting shaft 16a and which have the same diameters as the load receiving surfaces 14g, 14h of the spool 14.

When the lock plate 16 is mounted to the spool 14, the lock plate 16 is inserted into the cut-out portion 14d, with the connecting shaft 16a being inserted first. Thereafter, the lock plate 16 is rotated around the connecting shaft 16a. In this way, in the state in which the operation surfaces 16f, 16g oppose the load receiving surfaces 14g, 14h, the lock plate 16 is mounted to the spool 14 so as to be freely swingable around the connecting shaft 16a. Further, in this state, the plate 16b and the plate 16c are disposed at the inner sides of the internal ratchets 12d, 12e of the frame 12 so as to oppose the internal ratchets 12d, 12e. In this way, when the plate 16b and the plate 16c are slid (guided) in direction B relative to the spool 14, the lock claws 16d, 16e can engage (self-lock) with the ratchet teeth 12f, 12g. At the time of engagement of the lock plate 16 with the internal ratchets 12d, 12e, due to the operation surfaces 16f, 16g abutting the load receiving surfaces 14g, 14h, the load applied to the lock plate 16 is supported by the spool 14, and the lock plate 16 can be prevented from falling out from the spool 14. Further, the range of swinging of the lock plate 16 is limited due to the lock plate 16 abutting the abutment portions 14l, 14m of the spool 14.

A guide pin 16h is formed at the plate 16b of the lock plate 16. The guide pin 16h is formed as a solid cylindrical projection, and stands erect at the side of the plate 16b which side, as seen from:the connecting shaft 16a, is further ahead of the operation surface 16f and is at the side opposite the side of connection with the connecting shaft 16a.

As shown in FIG. 3, a V gear 18 serving as a "lock wheel" is provided at the outer side of the leg piece 12a of the frame 12. The V gear 18 is formed substantially as a disc having a larger diameter than the end surface 14e of the spool 14. A hollow cylindrical boss 18a is formed at the axially central portion of the V gear 18. The rotation shaft 14b of the spool 14 is inserted into the boss 18a such that the V gear 18 is rotatably supported coaxially with the spool 14. A substantially backward-S-shaped guide hole 18b is formed in the v gear 18. The guide pin 16h which stands at the plate 16b of the lock plate 16 is inserted into the guide hole 18b. In this way, when relative rotation arises between the spool 14 and the V gear 18, the guide hole 18b guides the lock plate 16, via the guide pin 16h, to a position at which the lock plate 16 can engage with the internal ratchets 12d, 12e (i.e., swings the lock plate 16 in direction B relative to the spool 14). The detailed structure of the guide hole 18b will be described later.

Figure 6:
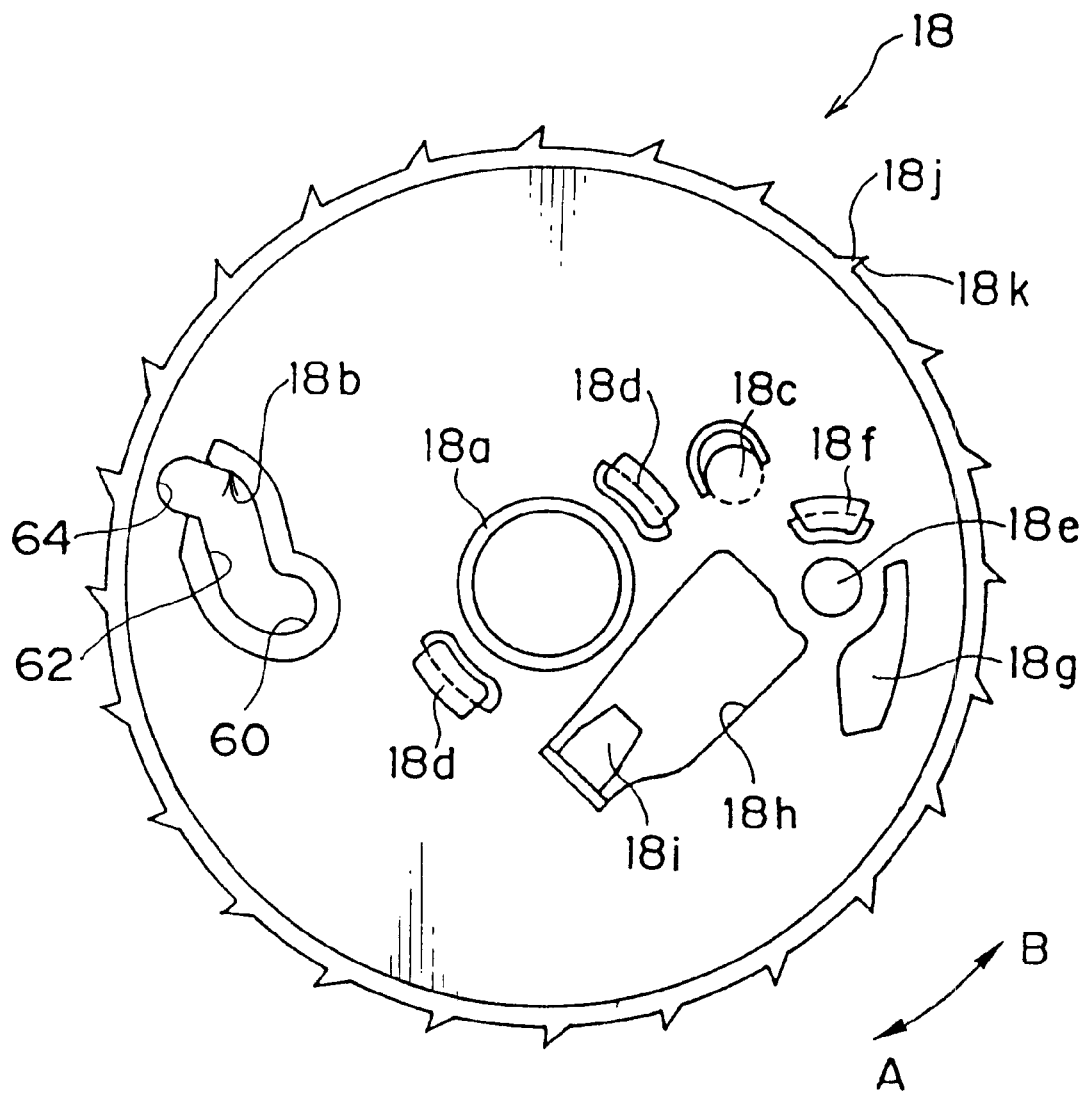
FIG. 6 is a plan view showing a V gear which forms the webbing retractor relating to the embodiment of the present invention.
Figure 7:
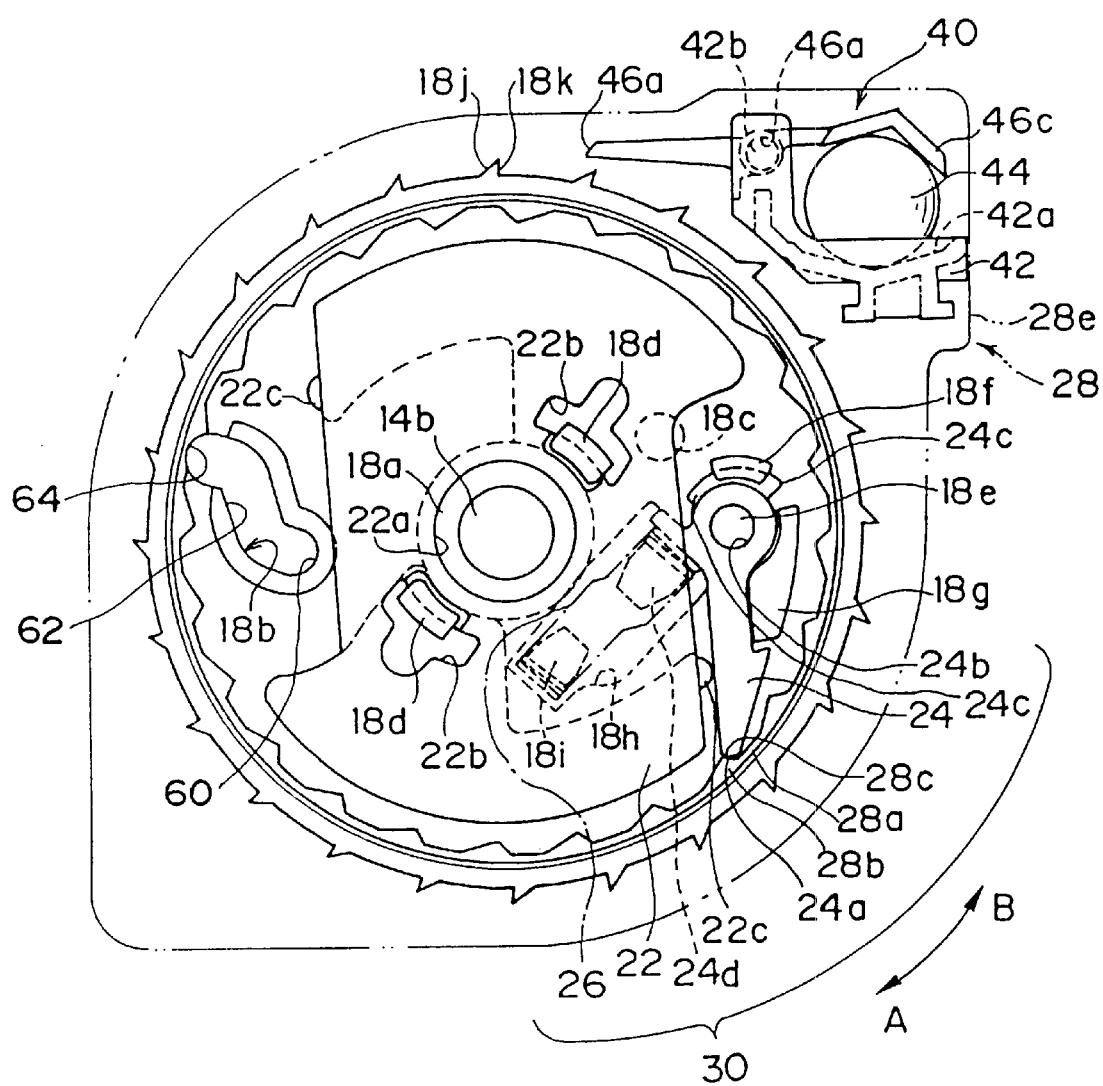
FIG. 7 is a side view showing an operating state of the W sensor forming the webbing retractor relating to the embodiment of the present invention.

Further, as shown in FIG. 6, a supporting projection 18c is provided at the spool 14 side surface of the V gear 18. The distal end portion of the supporting projection 18c is inserted into the second concave portion 14o provided at the end surface 14e of the spool 14. One end portion of a return spring 20, which is a torsion coil spring and which is to be considered as an "urging device" in the broader sense, engages with the supporting projection 18c. The return spring 20 is disposed within the first concave portion 14n around the rotation shaft 14b, in a state in which the other end portion of the return spring 20 is engaged with the spring receiving portion 14p of the spool 14. In this way, the lock plate 16 is urged in direction A with respect to the spool 14, via the guide pin 16h, the V gear 18 (the guide hole 18b), and the return spring 20. Usually, the lock plate 16 abuts the abutment portions 14l, 14m of the spool 14, so as to not obstruct rotation of the spool 14. In this way, the V gear 18 as well usually rotates integrally with the spool 14.

Anchor portions 18d are provided at the surface of the V gear 18 at the side opposite the spool 14 side. The anchor portions 18d are, as seen in plan view, formed in circular arc shapes which are coaxial with the boss 18a, and are disposed at two locations which are symmetrical with respect to the boss 18a. A pawl shaft 18e is provided at the anchor portion 18d side surface of the V gear 18. The pawl shaft 18e is formed in a solid cylindrical shape, and is disposed at a position which is substantially symmetrical, around the boss 18a, to the guide hole 18b. A pawl anchor portion 18f, which is formed in a circular arc shape which is concentric with the pawl shaft 18e as seen in plan view, is formed in a vicinity of the pawl shaft 18e at the same side surface of the V gear 18. A stopper 18g, which corresponds to the configuration of a pawl 24, is formed in a vicinity of the pawl shaft 18e and the pawl anchor portion 18f. A spring hole 18h is provided in the V gear 18. A spring receiving portion 18i is formed at the end surface of the spring hole 18h which end surface substantially opposes the pawl shaft 18e.

A plurality of external teeth 18j serving as "engagement teeth" are formed at uniform intervals in the outer peripheral portion of the V gear 18. Engagement surfaces 18k of the external teeth 18j are formed in circular arcs which correspond to the locus of swinging of a distal end portion 46b of a sensor lever 46 of an acceleration sensor 40 which will be described later.

As shown in FIGS. 1 and 3, an inertia plate 22 is provided at the side of the V gear 18 opposite the spool 14 side. The inertia plate 22 is formed as a disc from which two peripheral portions, which are symmetrical with respect to the axis of rotation, have been cut out. A support hole 22a is formed in the axially central portion of the inertia plate 22. Anchor holes 22b, which are formed in circular arc shapes which are concentric with the support hole 22 as seen in plan view, are formed at two positions in the inertia plate 22 which are symmetrical with respect to the support hole 22a. The support hole 22a and the anchor holes 22b correspond to the boss 18a and the anchor portions 18d of the V gear 18. The boss 18a is inserted into the support hole 22a, and the anchor portions 18d are inserted into the anchor holes 22b. The anchor portions 18d engage with the inner peripheral portions of the anchor holes 22b, and the inertia plate 22 is supported so as to be coaxial with the V gear 18 (the spool 14), and so as to be swingable, and so as to not fall off. Further, the circular arc at the axially central side of the anchor hole 22b is formed to be longer (to have a greater angle of circumference) than the circular arc of the anchor portion 18d. In an initial state, the inertia plate 22 is disposed so as to be able to swing in direction with respect to the V gear 18, in a range of the difference between the lengths (the angles of circumference) of these circular arcs. Further, engagement projections 22c are formed at the surfaces opposing direction A, at the cut-out portions of the inertia plate 22.

The pawl 24 is connected to the pawl shaft 18e of the V gear 18. The pawl 24 includes a distal end portion 24a which engages with internal teeth 28b provided at the sensor holder 28; a shaft hole 24b into which the pawl shaft 18e is inserted; an anchor projection 24c which anchors on the pawl anchor portion 18f; and a spring receiving portion 24d.

As shown in FIG. 3, the pawl 24 is swingably supported at the side surface of the V gear 18 in a state in which the pawl shaft 18e of the V gear 18 is inserted into the shaft hole 24b. In this state, the anchor projection 24c is anchored on the pawl anchor portion 18f such that the pawl 24 can be prevented from falling off. Further, the range of swinging of the pawl 24 is limited by the stopper 18g which corresponds to the configuration of the pawl 24. Moreover, one end portion of a coil spring 26 is inserted and held in the spring receiving portion 24d of the pawl 24. The coil spring 26 is disposed in the spring hole 18h of the V gear 18 in a state in which the other end portion of the coil spring 26 is inserted and held in the spring receiving portion 18i of the V gear 18. In this state, the pawl 24 is engaged with the engagement projection 22c of the inertia plate 22. Thus, the pawl 24 and the inertia plate 22 are urged in direction A with respect to the V gear 18, and usually rotate (revolve around the rotation shaft 14b) integrally with the V gear 18 without swinging.

The sensor holder 28, which is to be considered as a "supporting body" in the broader sense, is fixed and held at the outer side of the leg piece 12a of the frame 12. The sensor holder 28 is formed in a substantial cap shape, and is fixed and held at the outer side of the leg piece 12a in a state in which the opening portion thereof opposes the leg piece 12a and in which the V gear 18, the inertia plate 22, the pawl 24, and the like are accommodated within the interior thereof. A hollow cylindrical portion 28a is formed at the inner portion of the sensor holder 28. The internal teeth 28b serving as "engagement teeth" are formed at the inner surface of the cylindrical portion 28a. The internal teeth 28b are disposed at the outer side of the pawl 24. When the pawl 24 swings in direction B relative to the V gear 18, the internal teeth 28b can engage with the distal end portion 24a of the pawl 24.

In the above-described structure, the inertia plate 22, the pawl 24, the coil spring 26, and the internal teeth 28b form a W sensor 30 which forms a WSIR, and correspond to the "lock operation device" of the present invention.

A holder portion 28e is formed integrally with the outer peripheral portion of the sensor holder 28. The V sensor (acceleration sensor) 40 is provided in the holder portion 28e. Note that the V sensor 40 is not shown in FIG. 1.

As shown in FIG. 3, the V sensor 40 has a housing 42, and the housing 42 is fixed and held at a holder portion 28e of the sensor holder 28. A bottom surface 42a, which is V-shaped and has a shallow bottom, is formed at the housing 42. A ball 44, which serves as an inertial body, is placed on the bottom surface 42a. The sensor lever 46, which serves as a pawl, is connected to the housing 42. The sensor lever 46 is supported at the housing 42 so as to be freely swingable, by a support shaft 42b provided at the housing 42 being inserted into a shaft hole 46a provided at a substantially central portion of the sensor lever 46. The sensor lever 46 includes a distal end portion 46b which can engage with the external teeth 18*j* of the V gear 18, and an abutment portion 46*c* which is formed at the side of the shaft hole 46*a* opposite the side at which the distal end portion 46*b* is provided and whose inertial moment is greater than that of the distal end portion 46*b*. The abutment portion 46*c* abuts and is set on the ball 44. In this state, the distal end portion 46*b* is, due to gravity, positioned at a position of non-engagement with the external teeth 18*j* of the V gear 18. In this way, at the V sensor 40, the non-engaged state of the distal end portion 46*b* and the external teeth 18*j* of the V gear 18 is usually maintained due to gravity. At the time of rapid deceleration of the vehicle, due to the ball 44 rolling on a seat surface 44*a*, the sensor lever 46 swings, such that the distal end portion 46*b* moves to a position of engagement with the external teeth 18*j* of the V gear 18.

In the above-described structure, the V sensor 40 and the external teeth 18*j* form the VSIR, and in addition, correspond to the "lock operation device" of the present invention.

Structure of Main Portions of Webbing Retractor 10

In the present embodiment, as shown in FIGS. 8 through 11 and elsewhere, the configuration of the guide hole 18*b* formed in the V gear 18 is specially designed, as will be described in detail hereinafter.

Figure 8:
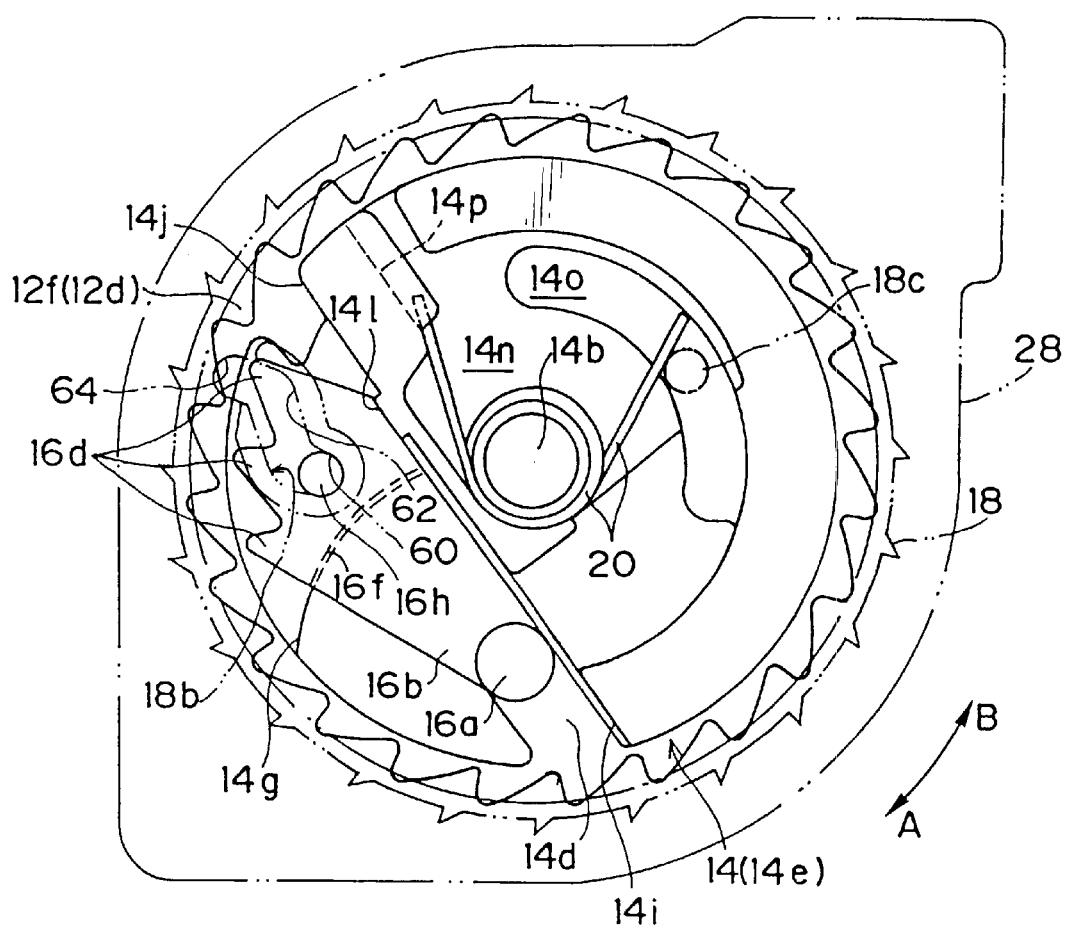
FIG. 8 is an operation explanation view showing a locking process (initial state) of the webbing retractor relating to the embodiment of the present invention.

The guide hole 18*b* is formed from three elements which are a first hole portion 60, a second hole portion 62 and a third hole portion 64. The first hole portion 60 is formed at the axially central side of the V gear 18. As shown in FIG. 8, in an initial state, the guide pin 16*h* formed at the lock plate 16 is positioned at the base end portion of the first hole portion 60. The base end portion of the second hole portion 62 communicates with the final end portion of the first hole portion 60. The second hole portion 62 is formed substantially linearly from the final end portion of the first hole portion 60 at an incline toward the radial direction outer side. The length and slope and the like of the second hole portion 62 are set such that the reverse rotation angle of the V gear 18 is slightly greater than a target value. Further, the base end portion of the third hole portion 64 communicates with the final end portion of the second hole portion 62. The third hole portion 64 is formed linearly toward a radial direction outer side and parallel to the first hole portion 60. This third hole portion 64 is a portion which is newly added. The various dimensions of the second hole portion 62, such as the length and the slope and the like thereof, can be arbitrarily set by forming the third hole portion 64.

Next, operation of the present embodiment will be described.

In the webbing retractor 10 having the above-described structure, the spool 14 is supported so as to be freely rotatable, and the lock plate 16 is urged in the webbing pull-out direction (direction A) by the return spring 20. Thus, usually, the spool 14, the lockplate 16, and the V gear 18 rotate integrally. Further, usually, the pawl 24 of the W sensor 30 is urged in direction A by the coil spring 26, and the sensor lever 42 of the V sensor 40 is held on the ball 46 due to gravity. Thus, the W sensor 30 and the V sensor 40 do not operate. Therefore, usually, the webbing 50 can be freely taken-up and pulled-out. Note that, at this time, relative rotation between the spool 14 and the V gear 18 does not arise, and the guide pin 16*h* of the lock plate 16 is held in the first hole portion 60 of the guide hole 18*b* formed in the V gear 18 (see FIG. 8).

Hereinafter, operation of the webbing retractor 10 will be described by describing a case in which the W sensor 30 is operated and a case in which the V sensor 40 is operated.

(Case in which W Sensor 30 is Operated)

When the webbing 50 is rapidly pulled-out, the spool 14 and the V gear 18 rotate at high speed in direction A. At this time, the inertia plate 22 does not follow the V gear 18, and an inertial delay is generated against the urging force of the coil spring 26, and the inertia plate 22 rotates in direction B relative to the V gear 18. When the inertia plate 22 rotates in direction B relative to the V gear 18, the pawl 24, which is engaged with the engagement projection 22*c* of the inertia plate 22, is pushed and swung in direction B and engages with the internal tooth 28*b* of the sensor holder 28 such that rotation of the V gear 18 in direction A is impeded (the state shown in FIG. 7).

When rotation of the V gear 18 in direction A is impeded, then, the spool 14 to which the webbing tensile force is applied rotates in direction A against the urging force of the return spring 20 and pushes the operation surface 16*f* of the lock plate 16 at the load receiving surface 14*g*. Because rotation of the V gear 18 in direction A is impeded, the lock plate 16, which is pushed at the operation surface 16*f*, cannot rotate following the spool 14. Thus, the guide pin 16*h* enters into the second hole portion 62 of the guide hole 18*b* of the V gear 18. In this way, the lock claw 16*d* is guided to a position at which engagement with the ratchet tooth 12*f* of the internal ratchet 12*d* is possible, and a lock standby state arises (the state shown in FIG. 9). In this state, a portion of the distal end of the lock claw 12*d* enters a state of being engaged with the ratchet tooth 12*f*. Further, although not illustrated, the plate 16*c* of the lock plate 16, which is pushed by the operation receiving surface 14*h* of the spool 14, is also swung via the connecting shaft 16*a*. In this way, the lock claw 16*e* is guided to a position of engagement with the ratchet tooth 12*g* of the internal ratchet 12*e*, and a portion of the distal end of the lock claw 12*e* engages with the ratchet tooth 12*g*.

Figure 10:
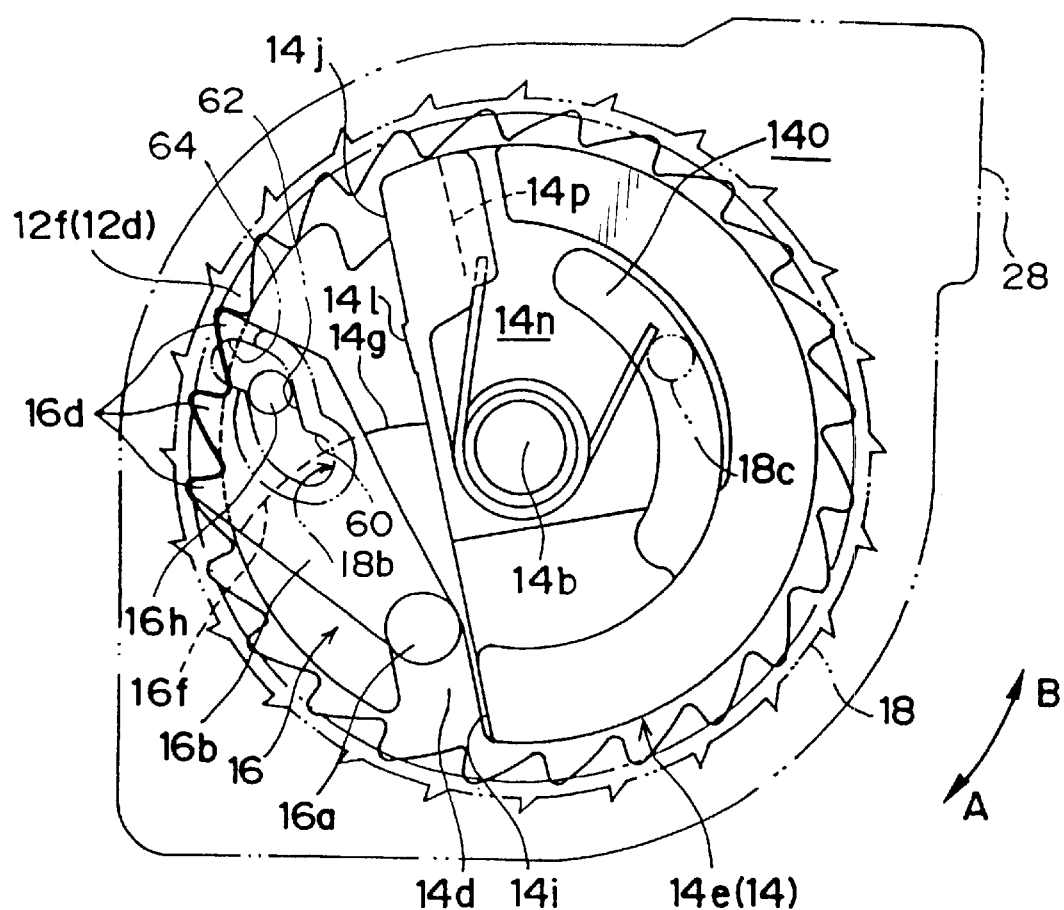
FIG. 10 is an operation explanation view showing the locking process (lock completion, when the V gear rotates reversely) of the webbing retractor relating to the embodiment of the present invention.
Figure 11:
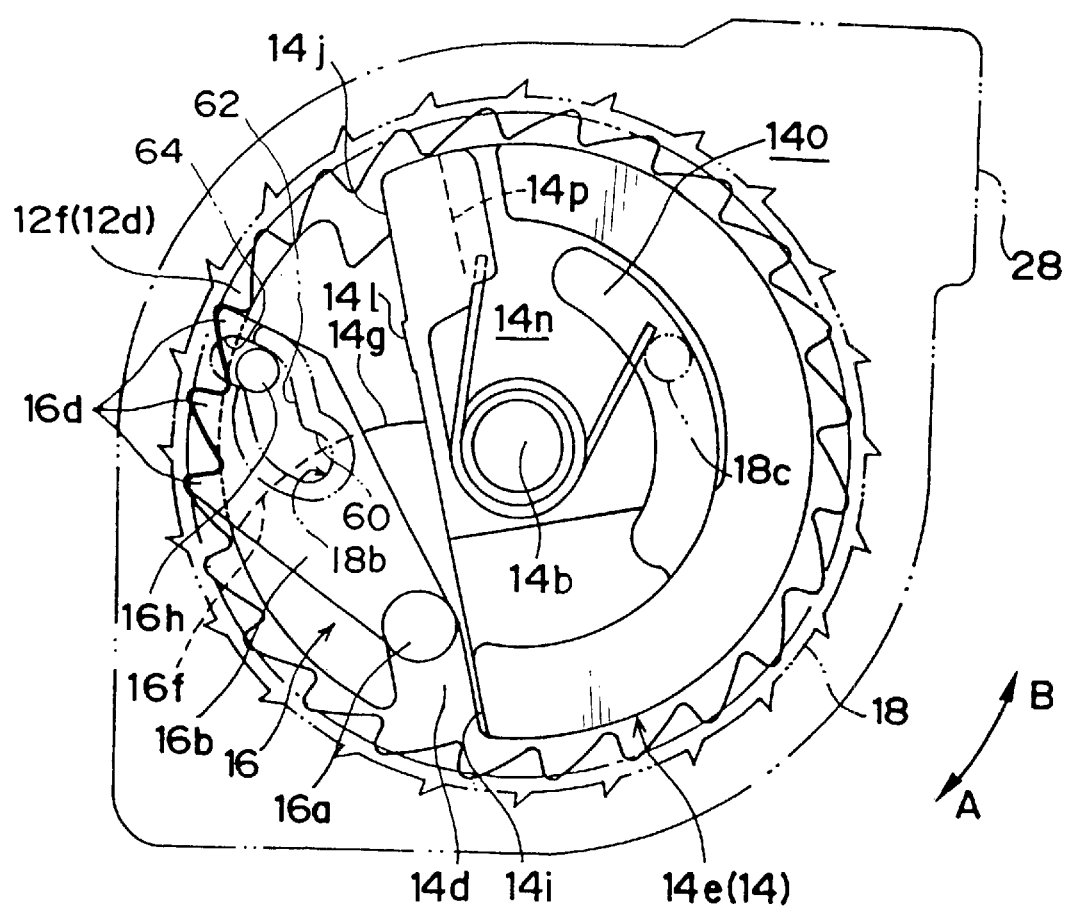
FIG. 11 is an operation explanation view showing the locking process (lock completion, at the time of a high load) of the webbing retractor relating to the embodiment of the present invention.
Figure 12A:
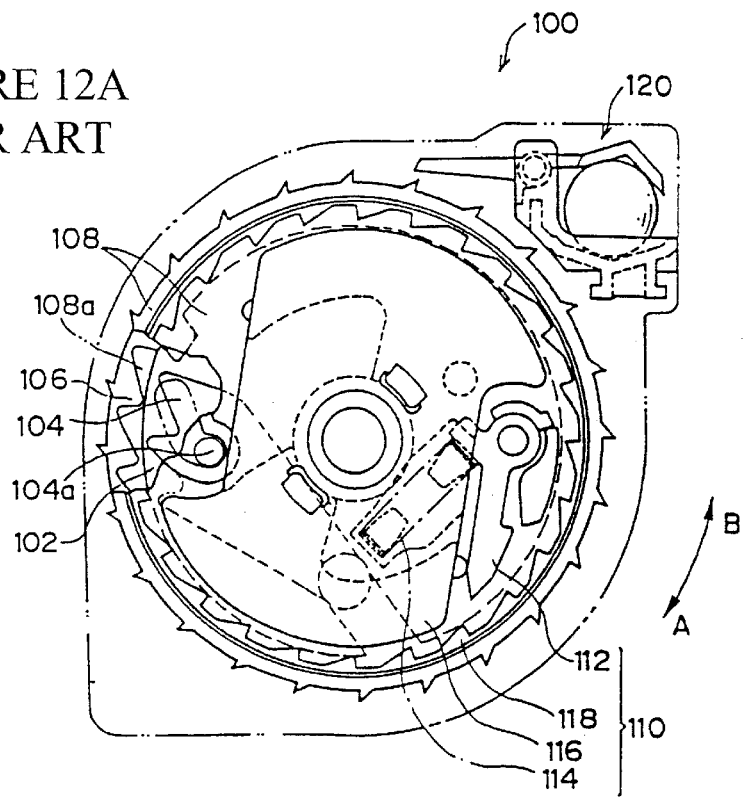
FIG. 12A is a side view showing a non-operating state of a W sensor forming a conventional webbing retractor.
Figure 12B:
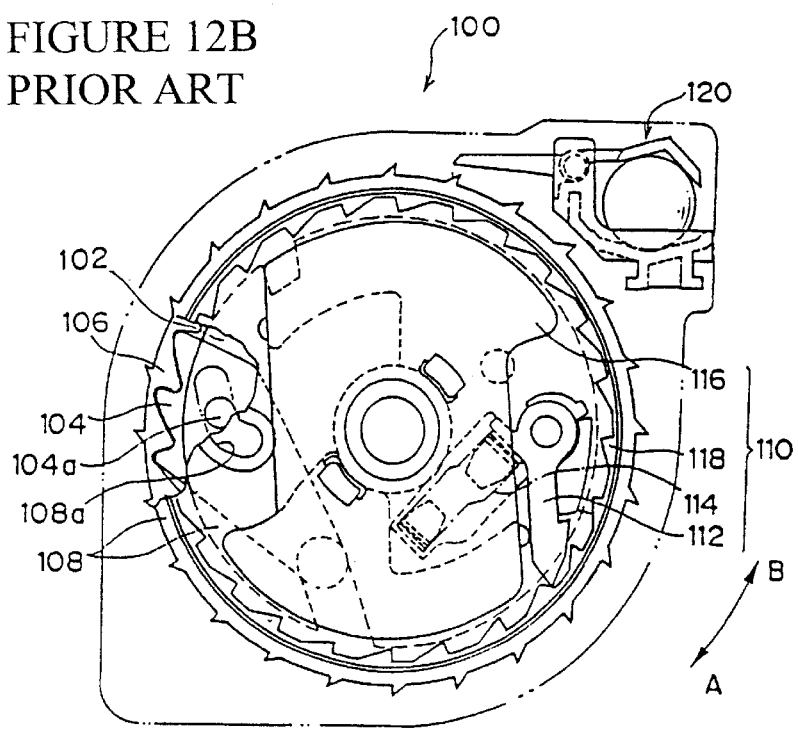
FIG. 12B is a side view showing an operating state of the W sensor forming the conventional webbing retractor.

When the lock claws 16*d*, 16*e* of the plates 16*b*, 16*c* are respectively guided to positions at which engagement with the ratchet teeth 12*f*, 12*g* is possible, as the spool 14 rotates further in direction A, the lock claws 16*d*, 16*e* are guided by the ratchet teeth 12*f*, 12*g* and reach the tooth bottoms of the ratchet teeth 12*f*, 12*g* (the state shown in FIG. 10). In this way, the lock plate 16 is reliably locked by the internal ratchets 12*d*, 12*e*, and rotation of the spool 14 in direction A is impeded, and further pulling-out of the webbing is limited. Namely, after the lock claws 16*d*, 16*e* have been guided to the positions at which engagement with the ratchet teeth 12*f*, 12*g* is possible, the spool 14 (the lock plate 16) self-locks.

Figure 9:
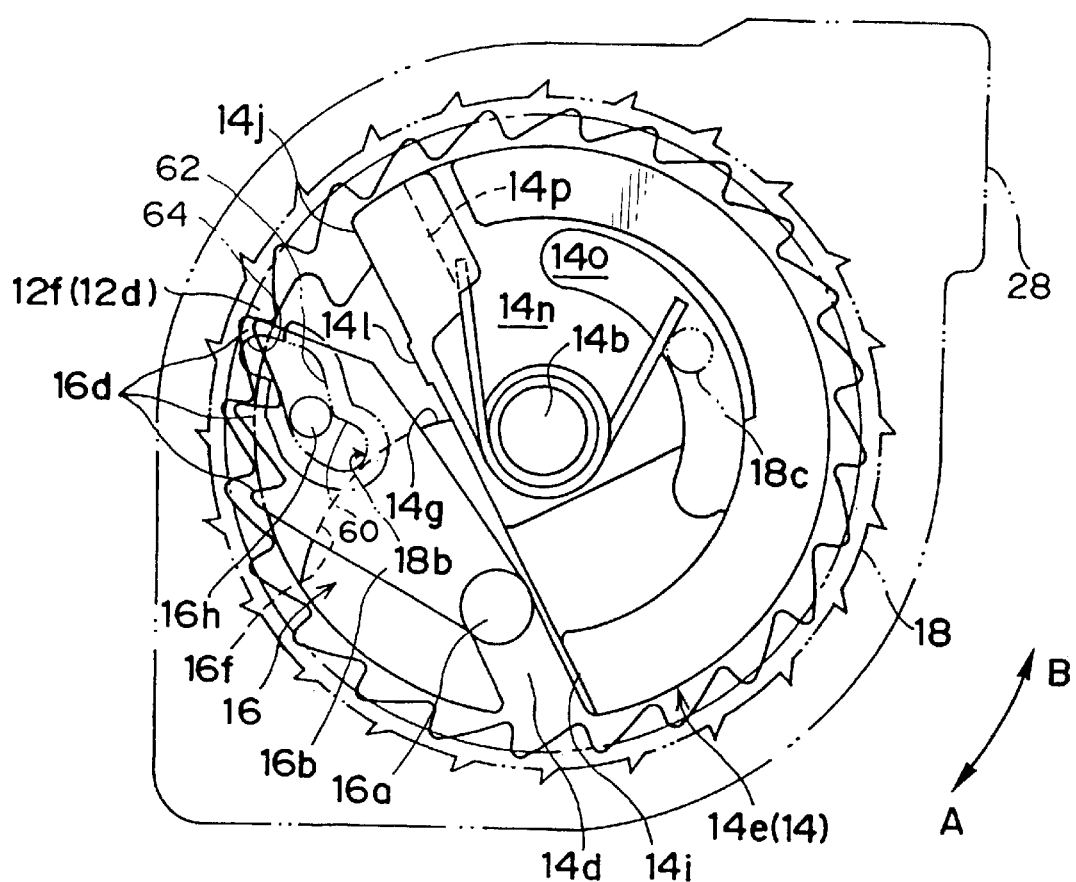
FIG. 9 is an operation explanation view showing the locking process (lock standby state) of the webbing retractor relating to the embodiment of the present invention.

At the time of self-locking, the plate 16*b* moves toward the tooth bottom of the ratchet tooth 12*f* (i.e., toward the left in FIG. 9). Accompanying this movement of the plate 16*b*, the guide pin 16*h* pushes the side wall of the guide hole 18*b* of the V gear 18 toward the left in FIG. 9, and due to this pushing moment, the V gear 18 is rotated slightly in direction B. When the V gear 18 is rotated a predetermined amount in direction B, the engagement of the distal end portion 24*a* of the pawl 24 and the engagement surface 28*c* of the internal tooth 28*b* is released, and the pawl 24 returns to its original position due to the urging force of the coil spring 26. Namely, operation of the W sensor 30 is cancelled.

On the other hand, after pulling-out of the webbing is hindered, the tension applied to the webbing 50 decreases, and when the spool 14 is rotated in direction B by a predetermined angle (i.e., when the webbing 50 is taken-up by a predetermined amount), the engaged state of the lock plate 16 and the internal ratchets 12*d*, 12*e* is cancelled.

Namely, when the spool 14 is rotated in direction B, the lock plate 16 is pushed at the connecting shaft 16a by the peripheral portion of the cut-out portion 14d of the spool 14. The lock claws 16d, 16e thereby move apart from the ratchet teeth 12f, 12g of the internal ratchets 12d, 12e, and due to the urging force of the return spring 20, the lock claws 16d, 16e return to their original positions together with the V gear 18 (return to the state illustrated in FIGS. 2 and 3). Note that the taking-up of the webbing after a decrease in the tension applied to the webbing 50 is achieved by an unillustrated power spring which is connected to the rotation shaft 14a of the spool 14.

In this way, in the process in which the pulling-out of the webbing is hindered, operation of the W sensor 30 is cancelled. Thus, thereafter, it is again possible to pull-out the webbing.

Here, in the present embodiment, because the third hole portion 64 which communicates with the second hole portion 62 is provided, when a pushing force of a predetermined value or more is applied from the guide pin 16h, the guide pin 16h enters into the third hole portion 64, and the pushing force can be avoided. Accordingly, the reverse rotation angle of the V gear can be prevented from becoming larger than needed. In other words, in accordance with the present embodiment, at the second hole portion 62, the reverse rotation angle of the V gear 18 can be set to be slightly larger than the target value such that the reverse rotation angle of the v gear 18 does not become too small. If a reverse rotation angle which is even greater is about to be applied to the V gear 18, the pushing force which contributes to that reverse rotation angle can be absorbed (cancelled) at the third hole portion 64. As a result, in accordance with the present embodiment, a situation can be prevented in which the reverse rotation angle of the V gear 18 is too small and the lock operation device is not cancelled. Further, a situation can be prevented in which the reverse rotation angle of the V gear 18 is too large, and the pawl 24 engages with the internal tooth 28b which is waiting next.

In this way, in the webbing retractor 10 relating to the present embodiment, a webbing pull-out impeded state can be reliably cancelled, and further, control of the V gear reverse rotation angle can be made easy.

In the above-described embodiment, both the W sensor 30 and the V sensor 40 are included. However, the present invention is not limited to the same, and the webbing retractor may be structured to include only one of the W sensor 30 and the V sensor 40. Further, the W sensor, which senses rapid pulling-out of the webbing, and the V sensor, which senses rapid deceleration of the vehicle, are not limited to the above-described structures, and it suffices for rotation of the V gear (the lock wheel) in the webbing pull-out direction to be impeded due to engagement of the pawl (sensor lever) and the engagement tooth in predetermined cases. Accordingly, for example, the V sensor may be provided beneath the V gear, and the sensor lever may be a structure in which the distal end portion and the abutment portion are the same.

Moreover, in the above-described embodiment, the plates 16b, 16c of the lock plate 16 are formed so as to be disposed at the both end portions of the spool 14. However, the present invention is not limited to the same, and, for example, the lock plate may be structured so as to be disposed at only one side of the spool. In this case, by disposing the lock plate at the side at which the V gear is disposed, there is no need for the connecting shaft and the cut-out portion of the spool.

The webbing retractor 10 relating to the above-described embodiment is structured so as to impede pulling-out of the webbing in predetermined cases. However, the present invention is not limited to the same, and various mechanisms may be added. Accordingly, for example, a pretensioner mechanism, in which the vehicle occupant is restrained by taking-up the webbing by a given amount at the time of a rapid deceleration of the vehicle, or a force limiter mechanism, which, after pulling-out of the webbing is impeded, permits the webbing to be pulled-out by a predetermined amount and absorbs energy, or the like may be added. In this case, the lock plate is not limited to a structure which is directly set at the spool. For example, the lock plate may be connected to the spool via a lock base which is connected to a torsion bar.

As described above, the webbing retractor relating to the present invention has the excellent effects that a webbing pull-out impeded state can be reliably cancelled, and control of a V gear reverse rotation angle can be made easy.

What is claimed is:

1. A webbing retractor comprising:

a take-up shaft for taking-up, in roll form, a webbing for restraining a vehicle occupant;

a frame which is fixed to a vehicle, and which rotatably supports both end portions of the take-up shaft, and at which a lock tooth is formed in a surface intersecting an end portion of the take-up shaft;

a lock plate which is provided at at least one end portion side of the take-up shaft, and which is movable between a position of engagement with the lock tooth and a position of non-engagement with the lock tooth, and due to the lock plate engaging with the lock tooth, the lock plate impedes rotation of the take-up shaft in a webbing pull-out direction;

a lock wheel provided coaxially with the take-up shaft at one end portion side of the take-up shaft, the lock wheel usually rotating integrally with the take-up shaft and holding the lock plate at the position of non-engagement, and when relative rotation arises between the lock wheel and the take-up shaft, the lock wheel moves the lock plate to the position of engagement; and a lock operation device having a pawl which is swingably supported and an engagement tooth which can engage with the pawl, the pawl usually being held at a position of non-engagement with the engagement tooth, and in a predetermined case, due to the pawl swinging and engaging with the engagement tooth, rotation of the lock wheel in the webbing pull-out direction is impeded, and due to the lock wheel being rotated in a webbing take-up direction, an engaged state of the pawl and the engagement tooth is cancelled, wherein a guide pin which projects toward the lock wheel is provided at the lock plate, and a guide hole is provided at the lock wheel, the guide pin being inserted into the guide hole, and the guide hole moving the lock plate from the position of engagement to the position of non-engagement or from the position of non-engagement to the position of engagement, and the guide hole is formed to include a first hole portion which holds the lock plate at the position of non-engagement via the guide pin, a second hole portion which communicates with the first hole portion and which, by receiving pushing force from the guide pin, makes the lock wheel rotate reversely in the webbing take-up direction, and a third hole portion which communicates with the second hole portion and which releases pushing force, of a predetermined value or more, of the guide pin which pushing force contributes to reverse rotation of the lock wheel.

2. A webbing retractor according to claim 1, wherein the lock plate is disposed at only one side of the take-up shaft.

3. A webbing retractor according to claim 2, wherein the lock plate is disposed at a side at which the lock wheel is disposed.

4. A webbing retractor according to claim 2, wherein the lock operation device has at least one sensor for operation control.

5. A webbing retractor according to claim 4, wherein the sensor is a webbing sensor, and the webbing sensor is accommodated within a holder which is provided at an outer side of one leg piece of the frame.

6. A webbing retractor according to claim 5, further comprising an acceleration sensor, the acceleration sensor being accommodated in a housing which is fixed to one portion of the holder of the webbing sensor.

7. A webbing retractor according to claim 6, wherein the acceleration sensor is provided beneath the lock wheel.

8. A webbing retractor according to claim 6, wherein the acceleration sensor includes a ball placed on a bottom surface of the housing, and a lever which is swingably supported at the housing, and the lever includes a first end portion which is engageable with external teeth of the lock wheel, and a second end portion which can abut an upper portion of the ball.

9. A webbing retractor according to claim 8, wherein the second end portion of the lever of the acceleration sensor has a larger inertial moment than an inertial moment of the first end portion.

10. A webbing retractor according to claim 1, wherein the lock plate is disposed at a side at which the lock wheel is disposed.

11. A webbing retractor according to claim 10, wherein the lock operation device has at least one sensor for operation control.

12. A webbing retractor according to claim 1, wherein the lock operation device has at least one sensor for operation control.

13. A webbing retractor according to claim 12, wherein the sensor is a webbing sensor, and the webbing sensor is accommodated within a holder which is provided at an outer side of one leg piece of the frame.

14. A webbing retractor according to claim 13, wherein the webbing sensor includes an inertia plate provided at a side of the lock wheel opposite the side at which the take-up shaft is disposed, so, as to be supported coaxially with the lock wheel and swingably; a pawl which is connected to a supporting shaft of the lock wheel and which is swingable at a side surface of the lock wheel; a spring held in a hole formed in the lock wheel; and internal teeth formed at an inner portion of the holder.

15. A webbing retractor comprising:
- a take-up shaft for taking-up, in roll form, a webbing for restraining a vehicle occupant;
- a frame which is fixed to a vehicle, and which rotatably supports both end portions of the take-up shaft, and at which a lock tooth is formed in a surface intersecting an end portion of the take-up shaft;
- a lock plate which is provided at only one side of the take-up shaft, and which is movable between a position of engagement with the lock tooth and a position of non-engagement with the lock tooth, and due to the lock plate engaging with the lock tooth, the lock plate impedes rotation of the take-up shaft in a webbing pull-out direction;
- a lock wheel provided coaxially with the take-up shaft at one end portion side of the take-up shaft, the lock wheel usually rotating integrally with the take-up shaft and holding the lock plate at the position of non-engagement, and when relative rotation arises between the lock wheel and the take-up shaft, the lock wheel moves the lock plate to the position of engagement; and
- a lock operation device having a pawl which is swingably supported and an engagement tooth which can engage with the pawl, the pawl usually being held at a position of non-engagement with the engagement tooth, and in a predetermined case, due to the pawl swinging and engaging with the engagement tooth, rotation of the lock wheel in the webbing pull-out direction is impeded, and due to the lock wheel being rotated in a webbing take-up direction, an engaged state of the pawl and the engagement tooth is cancelled, wherein a guide pin which projects toward the lock wheel is provided at the lock plate, and a guide hole is provided at the lock wheel, the guide pin being inserted into the guide hole, and the guide hole moving the lock plate from the position of engagement to the position of non-engagement or from the position of non-engagement to the position of engagement, and the guide hole is formed to include a first hole portion which holds the lock plate at the position of non-engagement via the guide pin, a second hole portion which communicates with the first hole portion and which, by receiving pushing force from the guide pin, makes the lock wheel rotate reversely in the webbing take-up direction, and a third hole portion which communicates with the second hole portion and which releases pushing force, of a predetermined value or more, of the guide pin which pushing force contributes to reverse rotation of the lock wheel.

16. A webbing retractor according to claim 15, wherein the lock plate is disposed at a side at which the lock wheel is disposed.

17. A webbing retractor according to claim 16, wherein the lock operation device has at least one sensor for operation control.

18. A webbing retractor comprising:
- a take-up shaft for taking-up, in roll form, a webbing for restraining a vehicle occupant;
- a frame which is fixed to a vehicle, and which rotatably supports both end portions of the take-up shaft, and at which a lock tooth is formed in a surface intersecting an end portion of the take-up shaft;
- a lock plate which is provided at only one side of the take-up shaft, and which is movable between a position of engagement with the lock tooth and a position of non-engagement with the lock tooth, and due to the lock plate engaging with the lock tooth, the lock plate impedes rotation of the take-up shaft in a webbing pull-out direction;
- a lock wheel provided coaxially with the take-up shaft at one end portion side of the take-up shaft, the lock wheel usually rotating integrally with the take-up shaft and holding the lock plate at the position of non-engagement, and when relative rotation arises between the lock wheel and the take-up shaft, the lock wheel moves the lock plate to the position of engagement; and
- a lock operation device having a pawl which is swingably supported and an engagement tooth which can engage with the pawl, the pawl usually being held at a position of non-engagement with the engagement tooth, and in a predetermined case, due to the pawl swinging and engaging with the engagement tooth, rotation of the lock wheel in the webbing pull-out direction is impeded, and due to the lock wheel being rotated in a webbing take-up direction, an engaged state of the pawl and the engagement tooth is cancelled, wherein the lock plate is disposed at a side at which the lock wheel is disposed, a guide pin which projects toward the lock wheel is provided at the lock plate, and a guide hole is provided at the lock wheel, the guide pin being inserted into the guide hole, and the guide hole moving the lock plate from the position of engagement to the position of non-engagement or from the position of non-engagement to the position of engagement, and the guide hole is formed to include a first hole portion which holds the lock plate at the position of non-engagement via the guide pin, a second hole portion which communicates with the first hole portion and which, by receiving pushing force from the guide pin, makes the lock wheel rotate reversely in the webbing take-up direction, and a third hole portion which communicates with the second hole portion and which releases pushing force, of a predetermined value or more, of the guide pin which pushing force contributes to reverse rotation of the lock wheel.

19. A webbing retractor according to claim 18, wherein the lock operation device has at least one sensor for operation control.

20. A webbing retractor according to claim 19, wherein the sensor is a webbing sensor, and the webbing sensor is accommodated within a holder which is provided at an outer side of one leg piece of the frame.

* * * * *